United States Patent [19]

D'Alessio et al.

[11] Patent Number: 5,521,965
[45] Date of Patent: May 28, 1996

[54] APPARATUS AND METHOD FOR HANDLING BUSY CALLS IN TELEPHONE NETWORK

[75] Inventors: Frederick D. D'Alessio, Hunt Valley; Robert E. Buchanan, Baltimore, both of Md.; Barbara A. Calautti, Annandale; Carolyn B. Smith, Randolph, both of N.J.

[73] Assignee: Bell Atlantic Network Services, Inc., Arlington, Va.

[21] Appl. No.: 355,331

[22] Filed: Dec. 12, 1994

Related U.S. Application Data

[63] Continuation of Ser. No. 929,238, Aug. 14, 1992, abandoned.

[51] Int. Cl.[6] .............................. H04M 3/42; H04M 3/50
[52] U.S. Cl. .............................. 379/67; 379/201; 379/213
[58] Field of Search ........................... 379/67, 88, 89, 379/201, 84, 213, 76

[56] References Cited

U.S. PATENT DOCUMENTS

| | | | |
|---|---|---|---|
| 3,570,008 | 12/1963 | Downing | 379/219 |
| 3,809,810 | 5/1974 | Walker et al. | 379/76 |
| 3,928,729 | 12/1975 | Nielson | 379/204 |
| 3,937,892 | 2/1976 | Bloch et al. | 370/85.7 |
| 4,166,929 | 9/1979 | Sheinbein | 379/207 |
| 4,197,430 | 4/1980 | Dowden | 379/266 |
| 4,706,270 | 11/1987 | Astegiano et al. | 379/84 |
| 4,766,604 | 8/1988 | Axberg | 379/67 |
| 4,809,321 | 2/1989 | Morganstein | 379/211 |
| 4,932,042 | 6/1990 | Baral et al. | 379/94 X |
| 4,935,958 | 6/1990 | Morganstein | 379/372 |
| 4,947,421 | 8/1990 | Toy | 379/67 |
| 5,023,868 | 6/1991 | Davidson | 379/89 |
| 5,056,086 | 10/1991 | Libonati | 379/213 |
| 5,303,298 | 4/1994 | Morganstein et al. | 379/88 |

OTHER PUBLICATIONS

E. Nussbaum et al. "Voice Storage System", Bell System Technical Journal, May–Jun. 1982, pp. 811–914 The Bell System Technical Journal, vol. 43, No. 5, parts 1 and 2 of Sep., 1964.

*Primary Examiner*—Jeffery Hofsass
*Assistant Examiner*—Daniel S. Hunter
*Attorney, Agent, or Firm*—Lowe, Price, LeBlanc & Becker

[57] ABSTRACT

A system and method for improving the completion rate of calls encountering a busy condition wherein the customer lines connected to a stored program controlled (SPC) switch having CLASS features are provided with a repeat call feature, comprising connecting such lines encountering a busy condition to announcement circuits in said switch which provide an announcement of the availability of a repeat call service for a specified charge upon the calling party disconnecting, reconnecting, and dialing specified characters. The announcement is followed by a simulated busy signal from the announcement circuitry. The switch thereupon periodically checks the condition of the called line for a predetermined period of time and upon detecting a free condition applies a distinctive ring signal to the calling line. Upon detection of the calling line going off-hook, the switch sends standard ringing to the called line. The announcement is preferably provided from multiple announcement trunks handled in a manner to maximize the efficiency of usage of a minimum number of announcement trunks.

29 Claims, 5 Drawing Sheets

APPARATUS AND METHOD FOR HANDLING BUSY CALLS IN TELEPHONE NETWORK

This application is a continuation of application Ser. No. 07/929,328 filed Aug. 14, 1992, now abandoned.

TECHNICAL FIELD

The present invention relates generally to telephone networks and more particularly to the processing of calls which encounter a busy condition.

BACKGROUND AND PRIOR ART

One of the most common problems in effecting communication via a switched telecommunications network is the requirement that the communicating parties in separate locations must be available simultaneously. In order to overcome this difficulty a variety of proposals for call handling have been advanced.

One such arrangement is the Voice Storage system described in the "Bell System Technical Journal", May–June 1982, pages 811–914. One of the services offered by the Voice Storage System is Advanced Calling Service wherein a calling customer may leave a message for a called customer. The calling customer calls a special number to get access to a voice storage system which provides to that voice storage system the voice message, the telephone number of the called customer and an indication of when the voice message is to be delivered. This service has the disadvantage that a calling customer who has just placed a call and found that the called customer is busy forfeits the option of initiating the call and relies on the often unpredictable habits of the called party with respect to retrieval of voice mail messages.

Some of these disadvantages in the mechanics of leaving a message in such a system are overcome in accordance with the teachings of U.S. Pat. No. 4,766,604 which describes a coin telephone comprising a microprocessor. This coin telephone stores the identity of the coin station, the called number, and, if the customer has used a calling card, the number of the calling card. When the calling customer hears a busy tone or recognizes that the called customer does not answer, the calling customer can arrange to have a connection automatically set up to a voice storage system by keying an appropriate access code such as *6. The coin telephone then temporarily disconnects the calling customer, transmits the number of the voice storage system to a connected switching system and, after a connection has been established to the voice storage system, transmits the number of the coin station, the called customer number, and the calling card number. Thus, from the customer's point of view, a connection is automatically set up to a voice storage system as soon as the customer keys the access code. However, such an arrangement requires the use of an expensive telephone instrument and is therefore both expensive and difficult to deploy widely since telephone customers are not likely to purchase such an expensive instrument. The called party's habits in voice mail usage remain a problem.

Another arrangement which permits telephone customers to leave messages via message storage systems is exemplified by the Audix service offered on System 85 Private Branch Exchange (PBX) manufactured by AT&T Technologies. When a calling customer calls someone served by the PBX and that person is busy or does not answer, if that customer keys an appropriate signal, a voice message for the called customer may be recorded for later delivery. This service is limited to destination of the PBX and does not serve the general public.

Other proposed solutions directed to handling PBX switching systems are described in U.S. Pat. Nos. 3,928,729 issued Dec. 23, 1975; 4,809,321 issued Feb. 28, 1989; 4,935,958 issued Jun. 19, 1990; and 4,166,929 issued Sep. 4, 1979. A proposed solution for an ISDN switch is described in U.S. Pat. No. 5,023,868 issued Jun. 11, 1991.

A still different arrangement is proposed in U.S. Pat. No. 4,947,421. That system involves a call waiting arrangement in which a caller is free to exercise discretion in interrupting an on-going telephone call. In this arrangement the caller is prompted by an audible announcement that the called party is busy but that the caller may request interruption of the call by remaining off-hook. If the caller believes that his call is sufficiently important he requests call interruption by remaining off-hook. If the caller chooses not to interrupt, he may make subsequent call attempts promptly because he knows that the called party is busy on another call rather than being away from home. Alternatively the caller may activate an automatic callback arrangement such that a call is completed between the two parties as soon as the status of the called station returns to on-hook.

SUMMARY OF INVENTION

Stored program control (SPC) central offices have gradually replaced electro-mechanical counterparts and are now dominant in the United States. Call processing in such offices and switches is controlled by a central processor.

When an off-hook signal is detected, the processor attaches a dial pulse of a DTMF receiver to the originating line. The receiver supplies dial tone and registers the incoming digits. The processor stores the details of the call in a temporary call store memory. Translation tables are stored in semipermanent memory. The processor establishes a path through the switching network, attaches 20 Hz ringing to the called party and an audible ringback signal trunk to the calling party. When the called party answers, the connection is completed. The processor operates under the direction of a generic program which contains the details of call processing. Features may be added by replacing the program with a new issue. Because of this factor, SPC machines are far more flexible than their electro-mechanical counterparts.

An example of such a switch is described in U.S. Pat. No. 3,570,008 issued Mar. 9, 1972, and "The Bell System Technical Journal", Vol. 43, No. 5, Parts 1 and 2 of September 1964.

According to the invention the completion rate of calls encountering a busy condition is improved in an economic and effective manner utilizing the available capabilities of SPC switches (analog or digital) and Central Offices (COs) on a switch by switch basis. This approach virtually eliminates the need for additional equipment and in its methodology assures that a maximum number of callers encountering a busy condition are effectively advised of the opportunity of convenient call completion.

Thus a caller encountering a busy condition is not connected to the tone trunk which supplies conventional 60 IPM busy signal. Instead, all or most of the customer lines connected to the SPC switch are provided with the new CLASS feature which is here described in terms of a Repeat Call Service. When a customer encounters a busy condition the originating line is checked to determine if it has the Repeat Call feature. Upon determining that it has the feature the SPC switch will then check to determine whether or not the terminating line has call forwarding active, is connected to a DID PBX line or other such lines that prohibit the operation of Repeat Call, or is otherwise in a condition that would disable it for the Repeat Call Service. When the response to those checks is negative the calling line is connected to an announcement trunk of the SPC switch where it receives an announcement advising that the called station is busy but that for a stated charge the CO will recheck the called line for the next 30 minutes or until it is not busy. The 30 minute interval is, of course, exemplary only. The caller is further instructed that to utilize such service he/she should momentarily hang up and then dial "*66" or another stated set of characters. This announcement is followed by a busy signal delivered from the announcement trunk with no connection to the conventional tone trunk for a busy signal.

Assuming that the caller accepts the service and dials "*66" the switch retains memory of the called party's directory number and thereafter initiates the periodic checks of the called line. Upon detecting termination of the busy condition the switch rechecks the caller's line and if it is free initiates a call to the original calling party via a distinctive ring signal. Upon detection of the calling party going off-hook, the switch sends standard ringing to the called party.

Where the system of the invention has been implemented by the necessary program change in a single switch the program includes an initial check to determine whether the busy station is technically capable of functioning with Repeat Call. Thus if only a single switch has been enabled, a call terminating at a different switch which does not have the new program will result in the initial check being negative. If this is the case, the calling party is connected to the conventional tone trunk to provide the 60 IPM busy signal.

As a further feature of the invention an arrangement is made to make maximum efficient use of available announcement trunks in the SPC switch and office. Thus provision is made for the following four conditions:

(1) An announcement trunk is available.

(2) An announcement trunk is available but not at the start of an announcement.

(3) All announcement trunks are busy.

(4) The path to the announcement trunks is busy.

According to the invention, following verification that the calling line has Repeat Call service and that the terminating line can properly function with Repeat Call, the switch checks the condition of the announcement trunks. On encountering an available trunk the caller is immediately connected and receives the announcement. On encountering an available trunk which is not at the start of an announcement the caller is connected to a ring-back signal until the announcement in progress is completed and is then connected to the announcement trunk to hear the announcement from the beginning. In the case where all announcement trunks are busy the caller is routed to the tone trunk to receive a 60 IPM busy tone signal. When all paths to the announcement trunks are busy, a 120 IPM reorder signal is returned to the customer. The arrangement and methodology of the invention provide the advantage that it may be effectuated on a per switch basis by reprogramming of the SPC switch to effectuate the described sequence of events.

It is accordingly a primary object of the invention to provide an improved arrangement for handling telephone calls which encounter a busy condition which maximizes the number of callers who are notified of the availability of the new service which may result in a more convenient and efficient means of reaching the called party.

It is another object of the invention to provide an improved system for handling calls which encounter a busy condition which minimizes the number of callers who fail to receive notification of the available new service, such as Repeat Call.

It is another object of the invention to provide an improved arrangement for handling calls encountering a busy condition by connecting such calls to an announcement trunk rather than the 60 IPM busy signal tone trunk and then providing a 60 IPM busy signal from the announcement trunk as part of the announcement message.

It is a still further object of the invention to provide a new and improved system and method for maximizing the percentage of attempted calls which are completed.

These and further advantages of the invention will become more apparent upon reference to the following specification, claims and drawings.

BEST MODE FOR CARRYING OUT THE INVENTION

Figure 1:
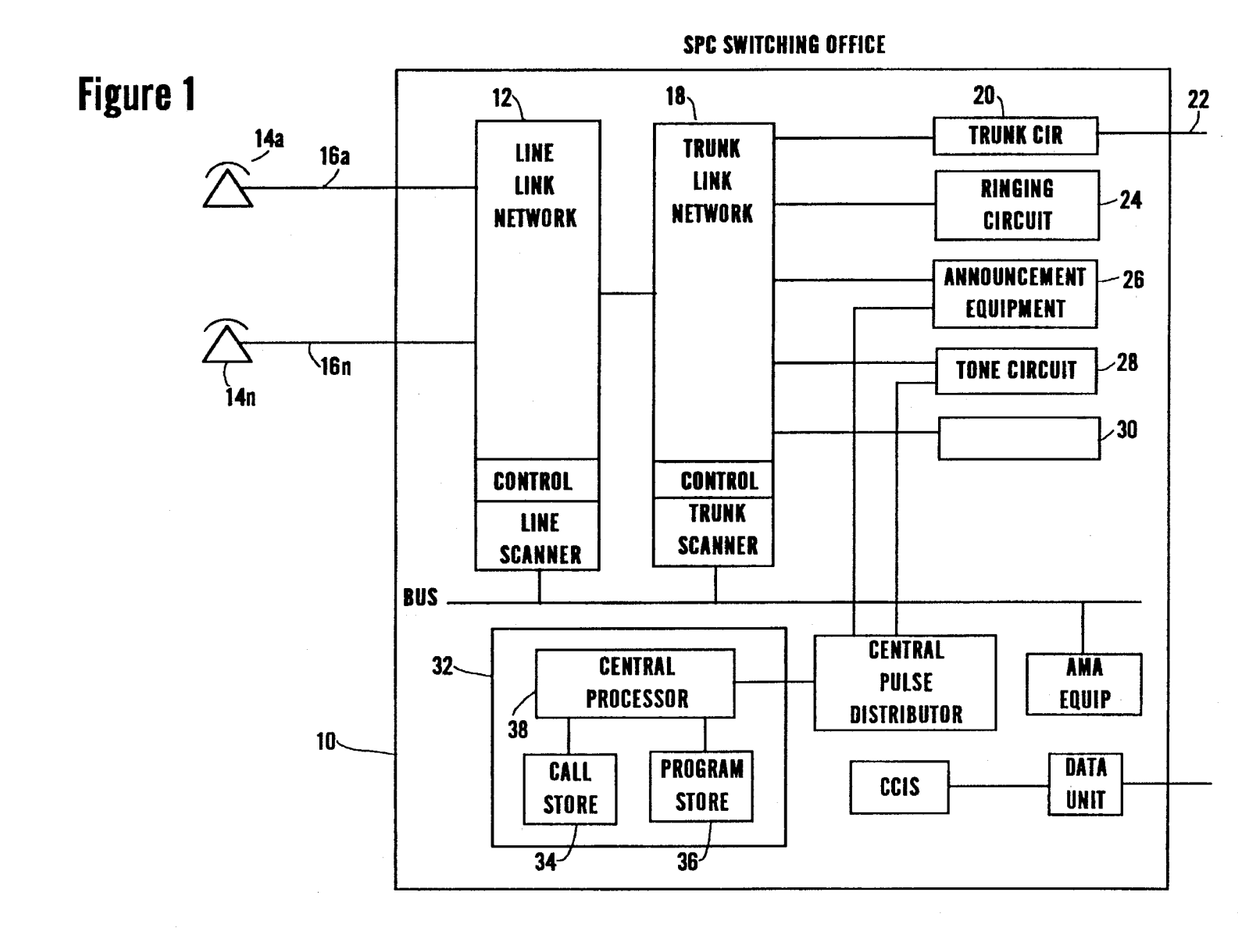
FIG. 1 is a simplified illustration of a typical stored program control (SPC) switch of the type with which the invention may be implemented.

Referring to FIG. 1 there is shown at 10 a stored program control switching office and switch such as the AT&T 1AESS or 5ESS or the Northern Telecom DMS100 or comparative Siemens switch. The switch includes the usual SPC switch components not all of which are illustrated in FIG. 1. The line link network 12 is connected to customer telephone stations 14a–14n by the customary customer lines 16a–16n. The trunk link network 18 is connected to the trunk circuit 20 and trunks 22 and to the various service circuit modules such as ringing circuit 24, announcement equipment 26, tone circuit 28 and the remainder of the various conventional modules indicated by the unlabeled module 30.

Call processing is controlled by the centralized data processing facility 32 which implements the varied telephone service, administrative and maintenance functions. It is divided functionally into three units comprising a call store 34, program store 36 and a central control processor 38. The call store is a temporary or erasable memory facility which employs apparatus for storing information pertaining to call services. Such information includes the busy-idle status of stations and communication paths through the line and trunk link networks, the digits received from a digit receiver, the digits required to be out-pulsed by a transmitter for completing a call, and the charging information to be recorded by automatic message accounting equipment for billing purposes.

The program store is a semi-permanent memory arrangement which is employed to store the less changing system information including the system programs and a variety of translation information, such as the director number-to-line equipment location data. Translation facilities are also furnished in the program store for deriving semi-permanent information for routing via the CCIS equipment as well as for charging, ringing and the like on telephone calls.

The central control processor 38 is the primary call processing unit of the system. It performs call processing in cooperation with the call store and program store and is capable of executing, one at a time, many types of basic instructions or orders required for controlling the line and trunk line networks, trunk circuits, announcement equipment and digit receiver during calls. These instructions are written in the form of programs which are stored in the program store. The programming instructions are the vocabulary of the machine and are used to inform the switching circuits of the system how and when to perform their various functions. The central processor requests an instruction from the program store every few microseconds and upon receipt executes or commands the appropriate circuit or circuits to carry out the appropriate functions.

Telephone features such as Call Forwarding, Repeat Call and the like have been based on feature logic and data contained within the centralized data processing facility 32. The feature logic is contained within the software program provided by the switch vendors and the feature data is administered by the telephone company (TELCO) through Recent Change/Verify capabilities, which are part of the switch software program.

New features may be introduced to an SPC switch through the installation of new software programs supplied by the switch vendors. Having the feature data contained in the switches impacts the administration of the data for customers served by several switches and requires coordination of feature data administration across several systems to ensure correct and consistent feature operation. The concept of the intelligent network (IN) to provide services based on feature logic and data located at a centralized node in the network, rather than in each individual switching system node, is being implemented to varying degrees by the regional operating telephone companies. The universal adoption of the IN service cannot be expected until some time in the future. The present invention is aimed at providing new feature services within the parameters of individual switches without awaiting implementation of the IN, although the new system is fully usable with the IN.

A basic purpose of the service of the present invention is to maximize successful connections and to minimize attempts which fail because a busy condition is encountered. This end is accomplished according to the invention through full utilization of the capabilities of individual SPC switching offices such as illustrated in FIG. 1.

Figure 2A:
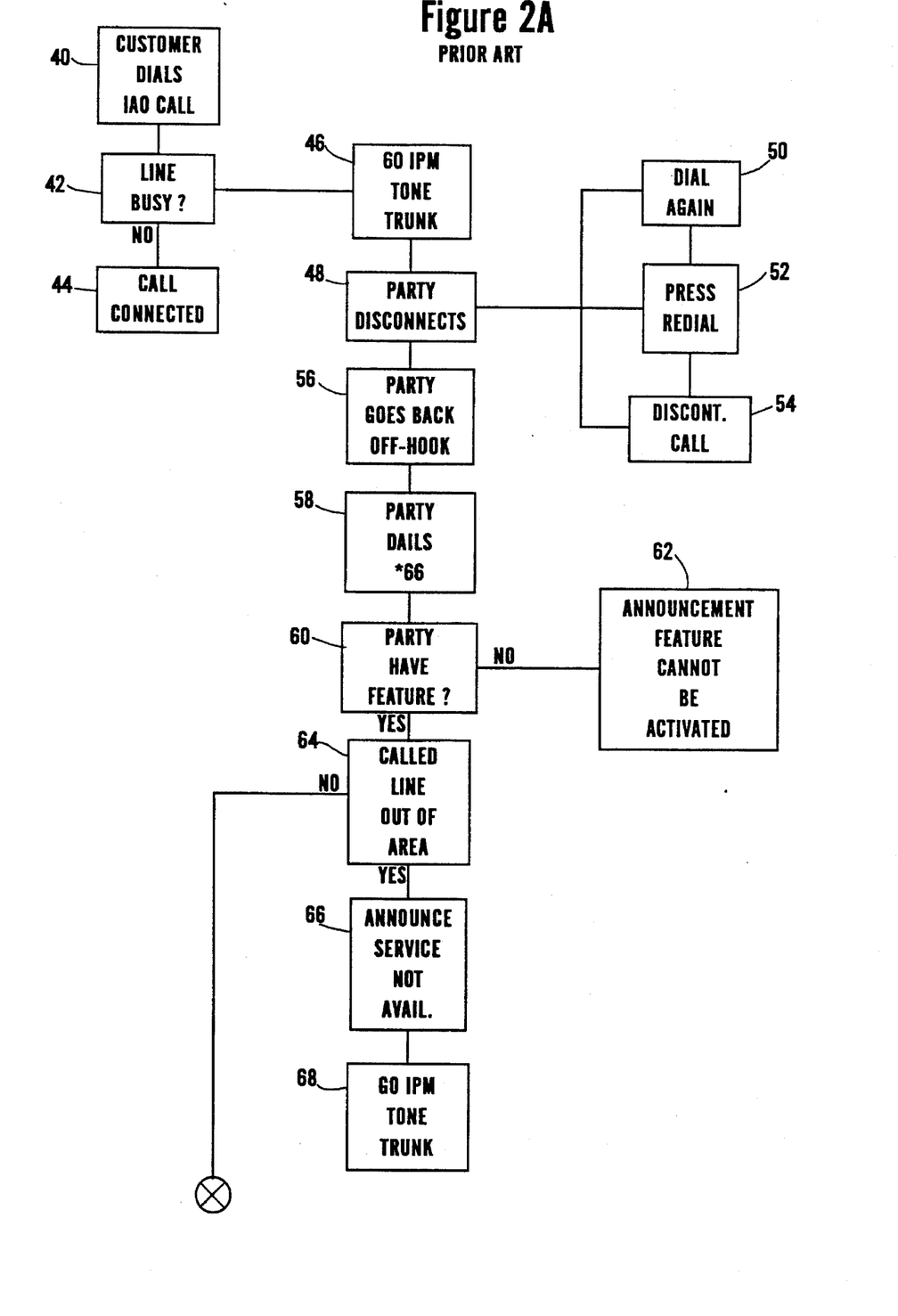
FIGS. 2A and 2B illustrate in flow diagram form an initial attempt to accomplish the purposes of the invention.
Figure 2B:
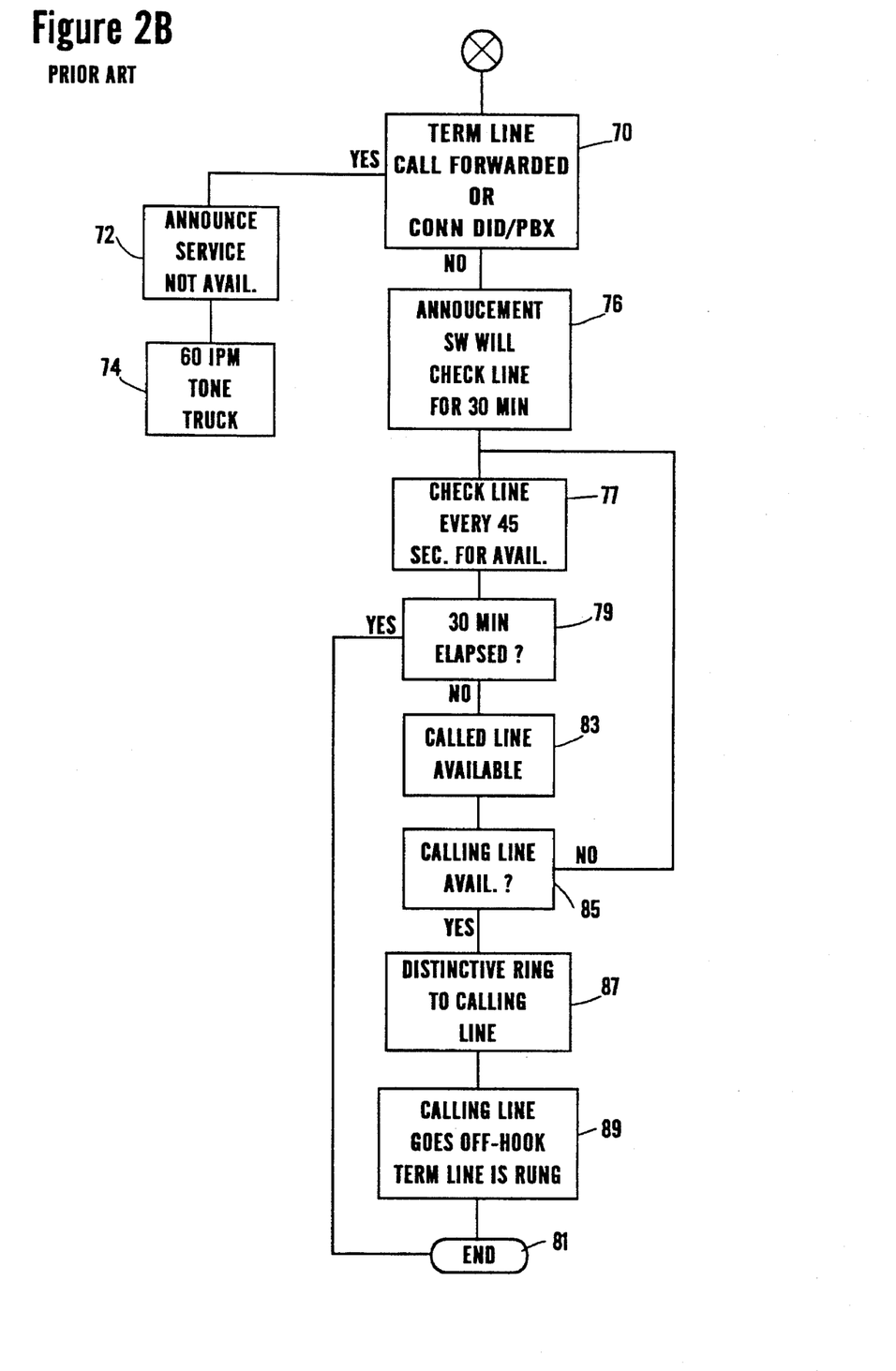

Referring to FIG. 2 there is shown a flow chart of the methodology initially utilized by the applicants which constitutes prior art. In this methodology the new service is made available to those customer telephones 14a–14n connected to SPC switching office 10 which have subscribed to the service.

Referring to FIG. 2A there is shown at 40 the initiation of an intra-office (IAO) telephone call by a customer such as telephone 14a dialing a directory number of a telephone station such as 14n connected to the office 10. At 42 the determination is made as to whether or not the called line is free and available or whether it is busy. If the line is available the call is connected at 44. If the line is busy the call is routed to the tone trunk or circuit as indicated at 46. The tone circuit returns a 60 IPM signal to the originating party which constitutes a conventional busy signal. The originating party disconnects at 48.

At this point the calling party has a variety of options. Thus the party can dial again as shown at 50, press redial as shown at 52 if the customer provided equipment (CPE) has that functionality, or simply discontinue the attempt as shown at 54.

If the calling party's line is provisioned with Repeat Call, the calling party can immediately go back off-hook at 56 and dial "*66" at 58. The switch at step 60 determines whether the calling party has access to Repeat Call. If the party's line is not provisioned with Repeat Call, the line is connected at step 62 to an announcement which states that the feature cannot be activated. If the party has the feature the call proceeds to 64 where the switch determines whether the called directory number is served by the switch or other switches that are connected and equipped with the SS7 technology so that the feature is available. If the called number is not served by the network in which the service is available, the switch provides via its announcement equipment an announcement that the feature is not available as indicated at 66. After the announcement at step 62, a connection is made to the 60 Hz IPM tone trunk so the the customer receives the busy tone.

If the called but busy number is served by the switch 10 or the network in which the service is effective, the call proceeds to 70 in FIG. 2B where the switch determines whether or not the called directory number or station has been call forwarded, connected to a DID line to a PBX, or otherwise in a condition disabled to the service. If the terminating station has call forwarding active, a 120 IPM reorder tone is returned to the originating party at 74. If the terminating station is a DID line, an announcement is given indicating that the feature cannot be activated, as indicated at 72.

If the called line is in a condition to effectuate the service the call proceeds from 70 to 76 where the announcement equipment in the switch provides an announcement that the service has been activated and that the service will check the called line for the next 30 (or other pre-determined) minutes. This check commences at 77 and will continue for 30 minutes. The 30 minute period is checked at 79. If the 30 minutes elapses before the called line becomes available the program is ended at 81. If the called line becomes available within the 30 minute period as indicated at 83 the switch at 85 determines whether the calling line is available. If that line is not available, scanning of the called line continues as indicated at 77. If the called line and calling lines are available, the switch applies a distinctive ringing signal to the originating or calling line at 87. Upon detection of the calling party going off-hook, the switch sends standard ringing to the terminating or called line at 89. Connection is then made and the program ends as indicated at 81.

While this initial methodology provides an improvement in the percentage of call completions on encountering a busy condition, much is left to be desired. Knowledge of the availability of the service is limited resulting in a low subscription rate and usage.

Figure 3A:
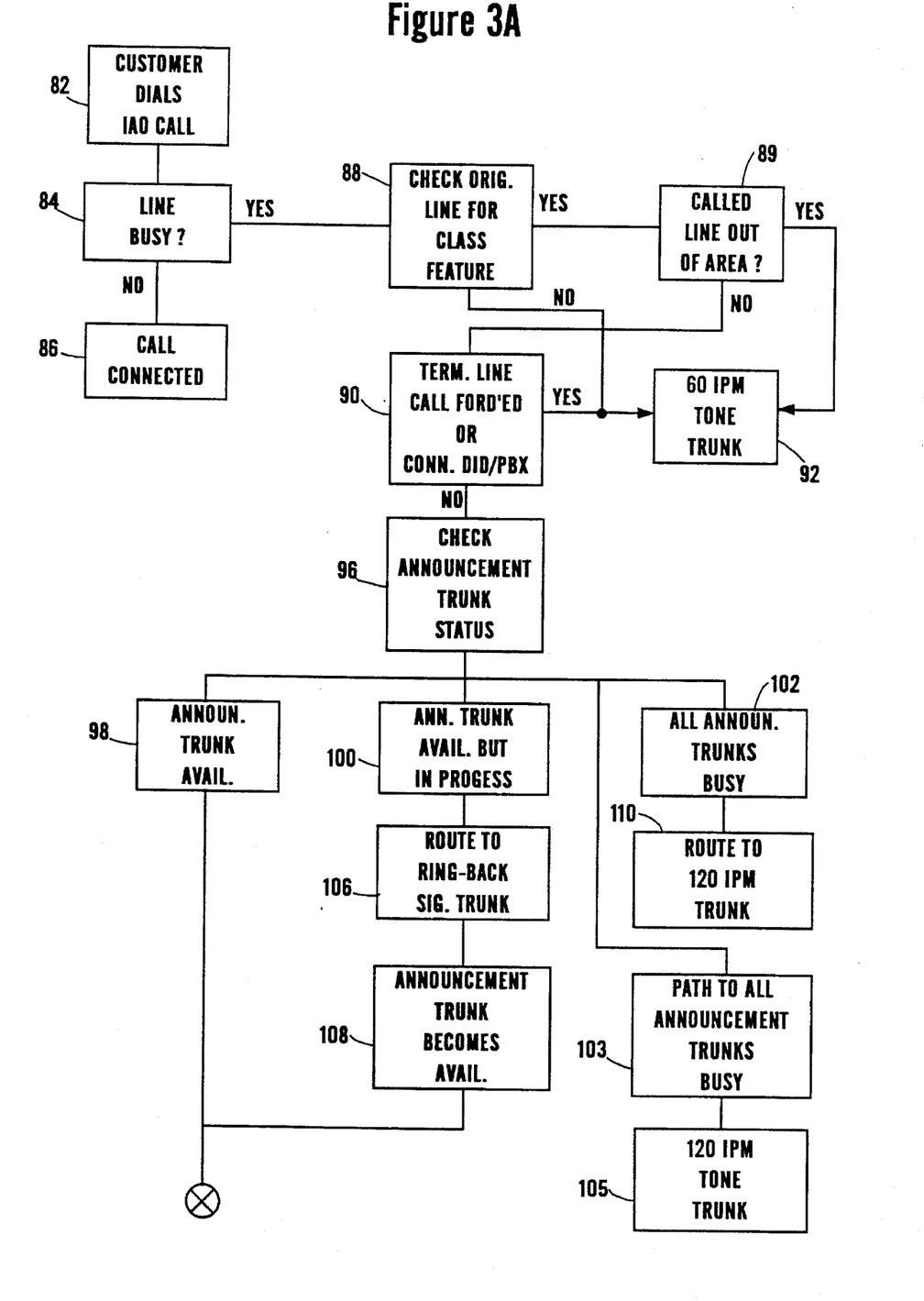
FIGS. 3A and 3B illustrate in flow diagram form the preferred embodiment of the invention.
Figure 3B:
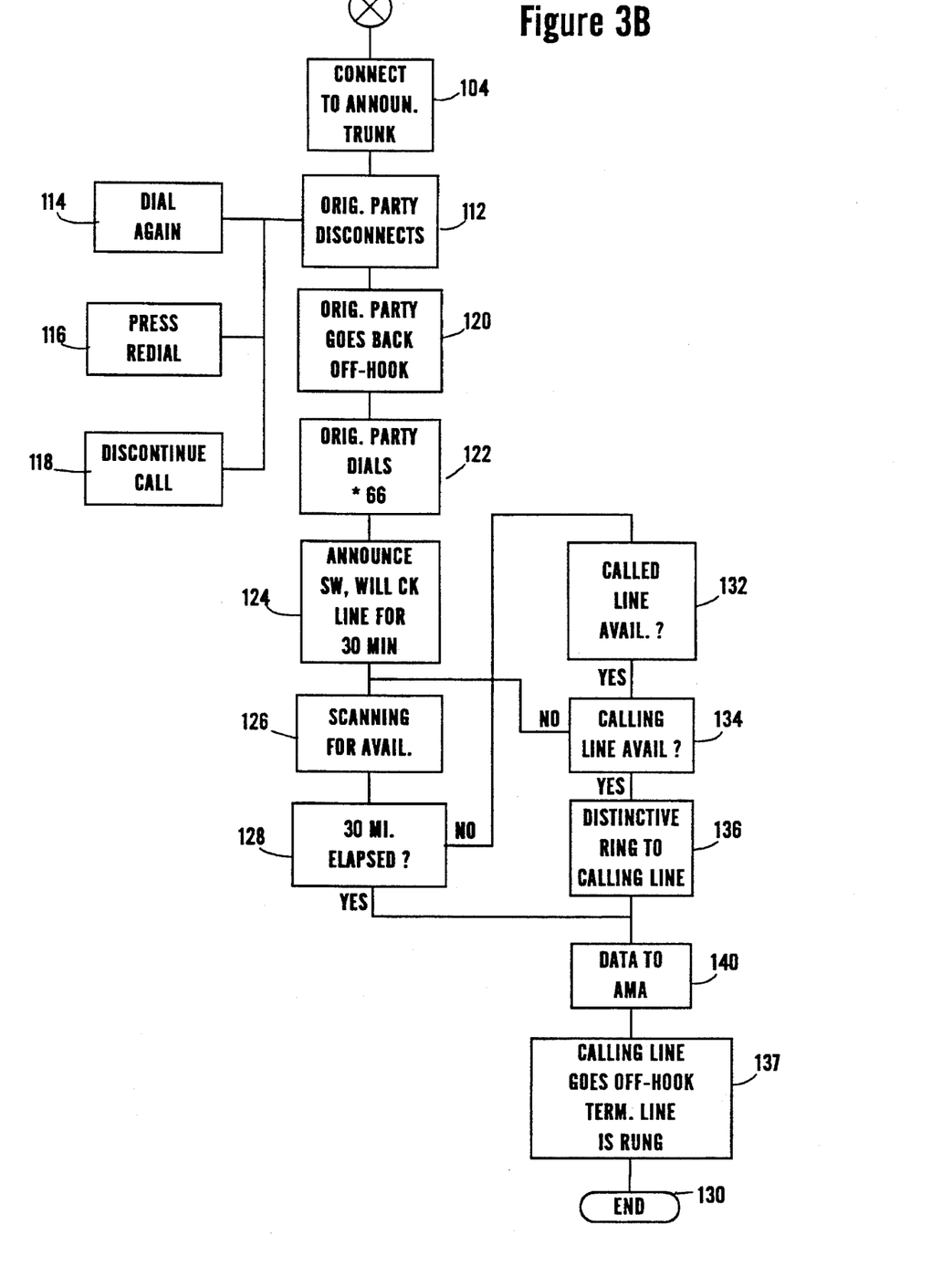

Referring to FIG. 3 there is shown the preferred embodiment of the invention which is capable of providing a much more widespread knowledge of the service and convenience of usage. According to this embodiment of the invention a customer connected to SPC switch 10 dials another customer connected to that switch at 82 in FIG. 3A. The line busy determination is made at 84 and if the line is available the call is connected at 86.

If the line is busy the call proceeds to 88 where the switch checks to determine whether or not the calling party line is provisioned with the Repeat Call feature. Initially all or substantially all customer lines connected to switch 10 may have this feature installed without charge. The customer having the service thus installed may use the service on the charge-per-use basis articulated in the announcement. Alternatively the customer may subscribe to the service for a flat monthly charge and then use the service without incurring the per-use charge. If the response to the inquiry at 88 is affirmative, the call proceeds to 89 where a determination is made as to whether or not the called line is connected to the same switch or is out of the area (in the situation where the service is available only on the one switch). If the answer is affirmative, i.e., the called line is not connected to the same switch, the call proceeds to 92 where a 60 IPM busy signal is provided.

If the called line is connected to the same switch and is thus in the area the response to the inquiry at 89 is negative and the call proceeds to 90 where a determination is made as to whether or not the called line has been call forwarded or is connected to a DID in a PBX. If the answer is affirmative the call proceeds to the 60 IPM busy signal at 92.

If the determination at 90 is negative the call proceeds to 96 where the switch checks the status of the announcement trunks from the announcement equipment. Multiple trunks are provided containing an announcement that the called line is busy and that for a specified charge the call will be attempted for a period of 30 minutes. The caller desiring to use the service is further instructed to hang up and then pick up the receiver and dial "*66".

This announcement is repetitively available on all of the trunks provided for that purpose. As a result the check of the status of the announcement trunks at 96 could find the following conditions: (1) a trunk is available, (2) a trunk is available but the announcement is in progress; (3) all trunks are busy; and (4) the path to the announcement trunks is busy. These possibilities are indicated in FIG. 3A at 98, 100, 102 and 103. Thus if an announcement trunk is available at 98 the caller is connected to the announcement trunk to hear the announcement at 104 in FIG. 3B. If an announcement trunk is available but the announcement is in progress as indicated at 100 in FIG. 3A, the switch routes the calling line to the normal ringback signal trunk at 106. When the announcement in progress is completed and the announcement trunk becomes available at 108 the line is connected to the announcement trunk at 104 in FIG. 3B. If all announcement trunks are busy as indicated at 102 in FIG. 3A the calling line is routed to the 60 IPM busy signal at 110. If the path to the announcement trunks is busy at 103, the calling line is routed to the 120 IPM reorder trunk and receives the reorder signal at 105.

When the calling party is connected to the announcement trunk the caller receives the announcement one or more times as is predetermined and then hears a busy signal from the announcement trunk as an integral part of the announcement. The busy signal is the same 60 IPM signal as is provided on the tone trunk but is provided as part of the announcement without requiring usage of the tone trunk for a busy signal.

The user pursuant to hearing the announcement and busy signal disconnects at 112 at which time the user is in possession of the information regarding the availability of the service. At this point the user may simply dial again as shown at 114, press redial as shown at 116 (if the CPE has that functionality), or discontinue the attempt as shown at 118. On the other hand the user, having been advised of the availability of the service, may elect to use the service and immediately after disconnecting at 112 go back off-hook at 120 and dial "*66" at 122 to use the service. The exercise of this option is followed by a further announcement at 124 confirming that the TELCO will check the called line for the next 30 minutes. This check commences at 126. If 30 minutes elapses with no availability, as indicated at 128, the service is ended at 130.

On the other hand, if the response at 128 is negative and the called line becomes available at 132 the switch next checks to ascertain whether or not the calling line is available at 134. If the calling or originating line is available the switch applies a distinctive ringing signal to the originating line at 135. Upon detection of the calling party going off-hook, the switch sends standard ringing to the terminating line at 137. The call is completed and the service ends at 130. If the calling line is not available at 134 the scanning is resumed at 126.

According to the invention customers who have the capability to use Repeat Call are eligible to hear the "*66" feature announcement when a busy condition is encountered. That is, if the Repeat Call service can be effectuated between the calling line and the called line the calling line will hear the "*66" feature announcement. If the service cannot be effectuated, as by virtue of an out of area called party or a DID called line, the calling party is connected to a busy signal as described above. This results in the announcement being made in the majority of cases whereby knowledge of the service rapidly becomes widespread. Both the instructions regarding the availability of the service and the instructions for its use are contained within the operation of the system. Pre-subscription of the announcement is unnecessary and each caller encountering a busy condition has the option of accepting or not accepting the service under the conditions specified in the announcement. Billing is handled automatically through the AMA equipment.

It will be appreciated that the methodology of the preferred embodiment of the invention is such that knowledge of the availability of the new feature will become widely known in a short period of time as a result of the normal operation of the telephone system. Each user has the option to use or not use the new service but makes a deliberate decision in knowledge of its existence. The public is thus provided with an improved capability of completing calls upon encountering a busy condition. The invention is subject to implementation utilizing existing equipment without awaiting installation of IN services as seen in this application of the invention. While the service is provided on a switch by switch basis it will be appreciated that the system is applicable on an interswitch basis so long as all involved switches have the service.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A method for carrying out communications in a telecommunications system including a stored program control (SPC) switch connected to a plurality of customer stations over customer lines, said SPC switch having a processor and an associated memory, a call progress tone generator, first and second ringing circuits, means for playing a stored announcement over a plurality of announcement trunks via a trunk path, automatic message accounting (AMA) equipment, and CLASS service capabilities, the method comprising the steps of:

(a) providing substantially all said customer lines with a repeat call feature from said SPC switch;

(b) selectively generating a first type of busy signal for a calling customer line which encounters a busy condition of a corresponding called line which is ineligible for repeat call processing;

(c) detecting a busy condition on said trunk path and generating a second type of busy signal for a calling customer line when a busy condition is detected;

(d) detecting a busy condition on said announcement trunks and generating said second type of busy signal for a calling customer line when a busy condition is encountered on all said announcement trunks;

(e) detecting an announcement in progress on announcement trunks that are not busy and generating a first type of ring signal for a calling customer line when announcements in progress are detected on all announcement trunks that are not busy;

(f) transmitting a stored announcement to a calling customer line from said means for playing a stored announcement over one of a plurality of announcement trunks that is not busy and for which any announcement in progress is complete, and then generating a simulated first type of busy signal;

(g) responding to disconnection and reconnection and dialing of predetermined characters by a calling customer line which received said stored announcement by periodically checking the condition of the corresponding called line until a free condition is detected; and (h) upon detecting a free condition on said corresponding called line applying a second type of ring signal to the calling customer line, and upon said calling customer line going off-hook applying said first type of ring signal to said called line.

2. The method according to claim 1 wherein said first type of ring signal applied to said called line comprises a conventional ring signal of said SPC switch, and the second type of ring signal applied to the calling line comprises a different ring signal from said conventional ring signal.

3. The method according to claim 1 wherein the step of (b) connecting said calling customer lines to said means for playing comprises:

ascertaining whether the called line in a busy condition is one of said customer lines connected to said SPC switch to which said calling customer line is connected.

4. The method according to claim 3 wherein step (b) further comprises connecting a calling customer line to said call progress tone generator to transmit therefrom said first type of busy signal in the event a corresponding called line is not connected to said SPC switch to which said calling customer line is connected.

5. The method according to claim 1 further comprising the step of transmitting to said AMA equipment billing data for each successful activation.

6. The method according to claim 1, wherein step (b) further comprises the sub-steps of:

ascertaining whether a called line in a busy condition is in a call forwarded condition and, if so, connecting a corresponding calling customer line to said call progress tone generator and transmitting therefrom said first type of busy signal.

7. The method according to claim 4, wherein step (b) further comprises the sub-steps of:

ascertaining whether a called line in a busy condition is in a call forwarded condition and, if so, connecting a corresponding calling customer line to said call progress tone generator and transmitting to said corresponding calling customer line said first type of busy signal.

8. The method according to claim 1, wherein step (b) further comprises the sub-steps of:

determining whether a called line is eligible to be connected to a corresponding calling line in a Repeat Call service and if not, connecting said corresponding calling station to said call progress tone generator and transmitting therefrom said first type of busy signal.

9. A method for carrying out communications in a telecommunications system including a stored program control (SPC) switch, means for playing a stored announcement over a plurality of announcement trunks via a trunk path, automatic message accounting (AMA) equipment, and class service capabilities, the method comprising the steps of:

(a) providing customer lines with a repeat call feature from said SPC switch and generating a first type of ring signal on called customer lines which are not busy;

(b) generating a first type of busy signal and connecting a calling customer line which encounters a busy condition of a corresponding called line to said trunk path;

(c) detecting a busy condition over said trunk path and generating a second type of busy signal for said calling customer line when said trunk path is busy;

(d) transmitting a stored announcement to a connected calling customer line from said means for playing a stored announcement over one of a plurality of announcement trunks that are not busy followed by a simulated busy signal;

(e) responding to disconnection and reconnection and dialing of predetermined characters by a calling customer line which received said stored announcement to periodically check the condition of the corresponding called line until a free condition is detected; and (f) upon detecting a free condition at said corresponding called line applying a second type of ring signal to the calling customer line, and upon said line going off-hook applying said first type of ring signal to said corresponding called line.

10. The method according to claim 9 wherein said first type of ring signal applied to said called line comprises a conventional ring signal from a ring circuit of said SPC switch, and said second type of ring signal applied to the calling line comprises a different ring signal from said conventional ring signal.

11. The method according to claim 9 wherein the step of (b) connecting said calling customer lines to said means for playing comprises:

ascertaining whether the called line in a busy condition is one of said customer lines connected to said switch to which said calling customer line is connected, and if so, connecting said calling station to said stored announcement means.

12. The method according to claim 11 wherein step (b) further comprise connecting calling customer line to a call progress tone generator to transmit therefrom said first type of busy signal in the event a corresponding called line is not connected to said SPC switch to which said calling customer line is connected.

13. The method according to claim 9 further comprising the step of transmitting to said AMA equipment billing data for each successful activation.

14. The method according to claim 9, wherein step (b) further comprises the sub-steps of:

ascertaining whether a called line in a busy condition is in a call forwarded condition and, if so, connecting a corresponding calling customer line to a call progress tone generator and transmitting therefrom said first type of busy signal.

15. The method according to claim 9, wherein step (b) further comprises the sub-steps of:

determining whether a called line is eligible to be connected to a corresponding calling line in a Repeat Call service and if not, connecting said corresponding calling station to a call progress tone generator and transmitting therefrom said first type of busy signal.

16. In a telecommunications system including a stored program control (SPC) switch connected to a plurality of customer stations over customer lines, a call progress tone generator means for generating a first type of ringing signal, means for playing stored announcements over a plurality of announcement trunks via a trunk path, automatic message accounting (AMA) equipment, and class service capabilities, the improvement comprising:

(a) means for connecting calling customer lines to said SPC switch to enable a repeat call feature from said SPC switch;

(b) means for connecting a calling customer line that encounters a busy condition on a corresponding called line to said trunk path;

(c) means for detecting announcements in progress on announcement trunks;

(d) means for transmitting a stored announcement to said calling customer station from said means for playing a stored announcement followed by a simulated busy signal over an announcement trunk that is not busy and does not have an announcement in progress;

(e) means for responding to disconnection and reconnection and dialing of predetermined characters by a calling customer line which received said announcement by periodically checking the condition of corresponding called line to detect a free condition; and (f) means for responding to the detection of a free condition in said called line by applying a second type of ringing signal to the calling customer line followed by a first type of ringing signal to the called line upon the calling line going off-hook.

17. A telephone system according to claim 16 wherein said second type of ringing signal applied to the calling customer line is different from the first type of ringing signal applied to the corresponding called line.

18. A telecommunications system according to claim 16 including means for ascertaining whether the called line in a busy condition is one of said customer lines connected to said SPC switch to which said calling customer line is connected.

19. A telephone system according to claim 18 including means for connecting the calling station to said call progress tone generator to transmit therefrom a busy signal in the event said corresponding called line is not connected to said SPC switch to which said calling customer line is connected.

20. A telecommunications system according to claim 16 including means for ascertaining whether the corresponding called line in a busy condition is in a call forwarded condition and, if so, connecting said calling station to a call progress tone generator and transmitting therefrom a busy signal.

21. A telecommunications system according to claim 16 including means for determining whether the corresponding called line is eligible to be connected to the calling line in a Repeat Call service and if not, connecting said calling station to call progress tone generator and transmitting therefrom a busy signal.

22. A telecommunications system according to claim 16 wherein said means for connecting said calling stations to said means for playing includes means to provide identical stored announcements followed by a simulated busy signal on plural announcement trunks, means for checking said announcement trunks for an available trunk, means for connecting said calling line to said call progress tone generator when all said announcement trunks are busy, means for connecting said calling line to receive a ringback signal when the only available announcement trunk is in the process of delivering an announcement, and means for connecting said calling line to an available announcement trunk.

23. A method for carrying out communications in a telecommunications system including a stored program control (SPC) switch means for playing a stored announcement over a plurality of announcement trunks via a trunk path, automatic message accounting (AMA) equipment, and class service capabilities, the method comprising the steps of:

(a) providing said customer lines with a repeat call feature from said SPC switch;

(b) generating a first type of busy signal for a calling customer line which encounters a busy condition of a corresponding called line which is ineligible for repeat call processing;

(c) detecting an announcement in progress on announcement trunks that are not busy and generating a first ring signal for said calling customer line when announcements in progress are detected on all announcement trunks that are not busy;

(d) transmitting a stored announcement followed by a simulated busy signal to a calling customer line from said means for playing a stored announcement over one of a plurality of announcement trunks that is not busy;

(e) responding to disconnection and reconnection and dialing of predetermined characters by said calling customer line which received said stored announcement by periodically checking the condition of the corresponding called line until a free condition is detected; and (f) upon detecting a free condition of said corresponding called line applying a second type of ring signal to the calling customer line, and upon said calling customer line going off-hook applying said first type of ring signal to said corresponding called line.

24. The method according to claim 23 wherein said first type of ring signal applied to said called line comprises a conventional ring signal from a ring circuit of said SPC switch, and said second type of ring signal applied to the calling line comprises a different type of ring signal from said conventional ring signal.

25. The method according to claim 23 wherein the step of (b) connecting said calling customer lines to said means for playing comprises:

ascertaining whether the called line in a busy condition is one of said customer lines connected to said SPC switch to which said calling customer line is connected, and if so, connecting said calling station to said means for playing stored announcement.

26. The method according to claim 25 wherein step (b) further comprise connecting calling customer line to said call progress tone generator to transmit therefrom said first type of busy signal in the event a corresponding called line is not connected to said SPC switch to which said calling customer line is connected.

27. The method according to claim 23 further comprises the step of transmitting to said AMA equipment billing data for each successful activation.

28. The method according to claim 23, wherein step (b) further comprises the sub-steps of:

ascertaining whether a called line in a busy condition is in a call forwarded condition and, if so, connecting a corresponding calling customer line to a call progress tone generator and transmitting therefrom said first type of busy signal.

29. The method according to claim 23, wherein step (b) further comprises the sub-steps of:

determining whether a called line is eligible to be connected to a corresponding calling line in a Repeat Call service and if not, connecting said corresponding calling station to a call progress tone generator and transmitting therefrom said first type of busy signal.

* * * * *